April 5, 1966  J. ILLO  3,243,875
BILLET INSPECTION APPARATUS AND METHOD
Filed April 1, 1964
6 Sheets-Sheet 1

INVENTOR.
JOSEPH ILLO
By Donald G. Dalton
Attorney

April 5, 1966  J. ILLO  3,243,875
BILLET INSPECTION APPARATUS AND METHOD
Filed April 1, 1964  6 Sheets-Sheet 2
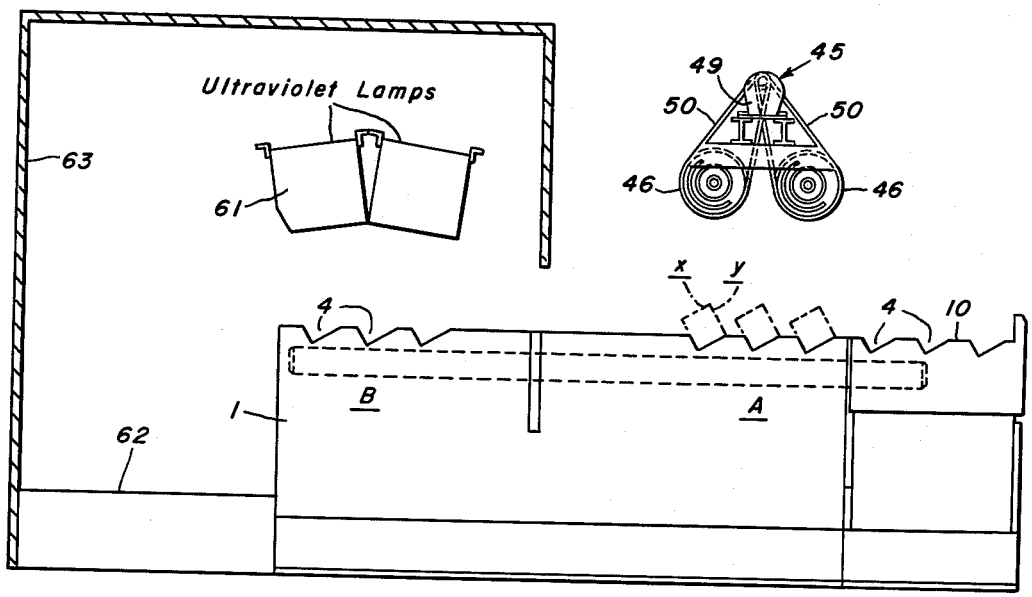
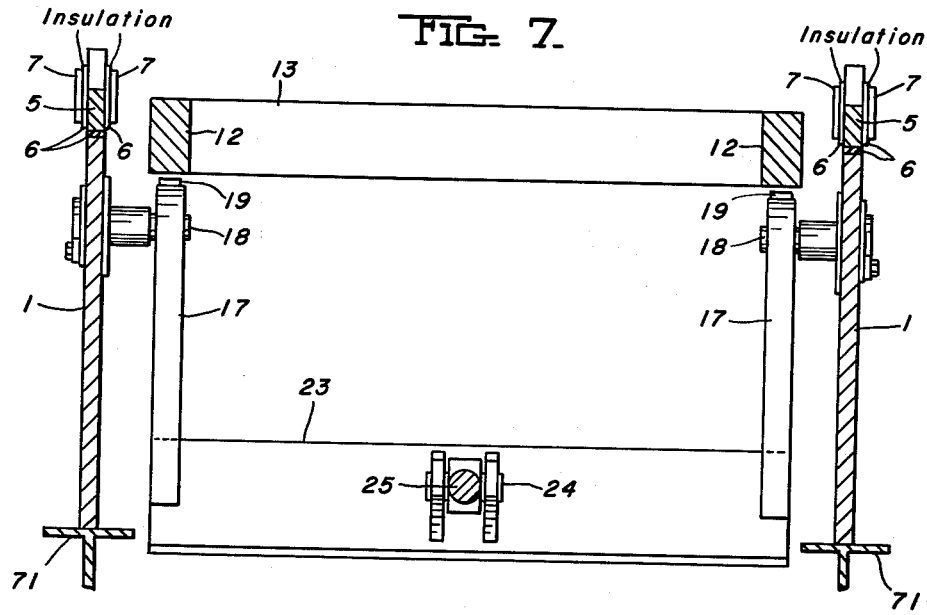
INVENTOR.
JOSEPH ILLO
By Donald G. Dalton
Attorney

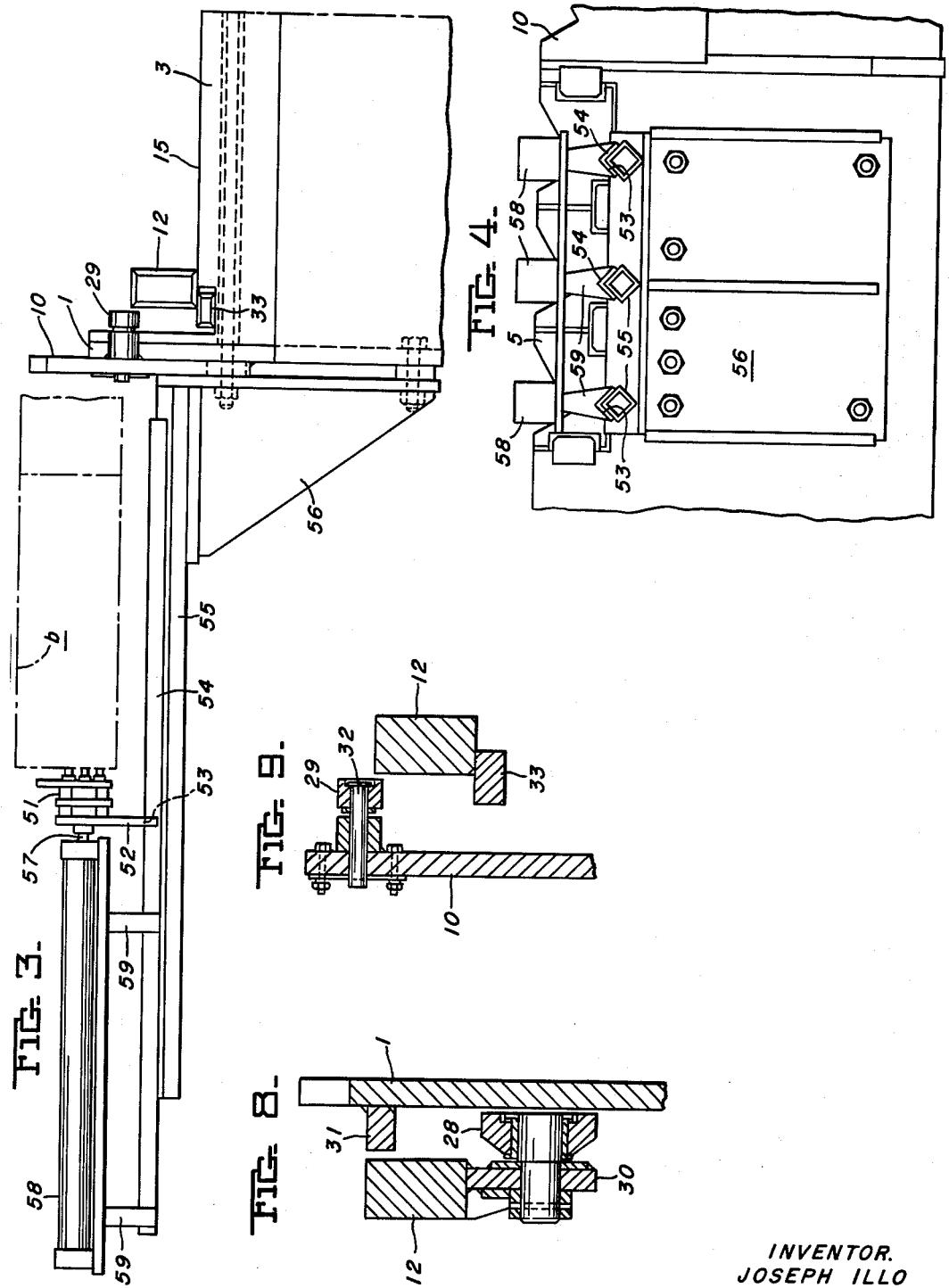

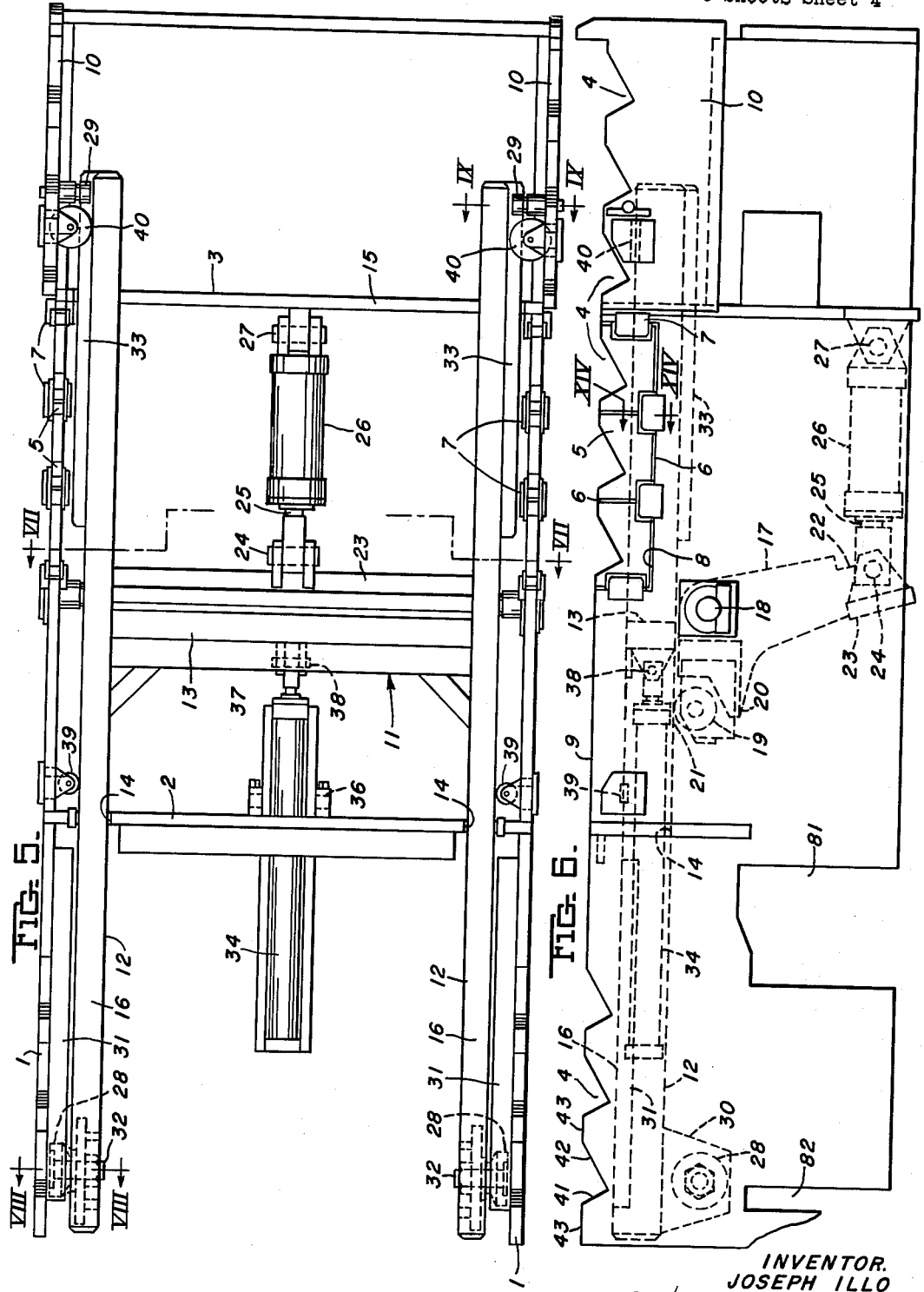

April 5, 1966
J. ILLO
3,243,875
BILLET INSPECTION APPARATUS AND METHOD
Filed April 1, 1964
6 Sheets-Sheet 5
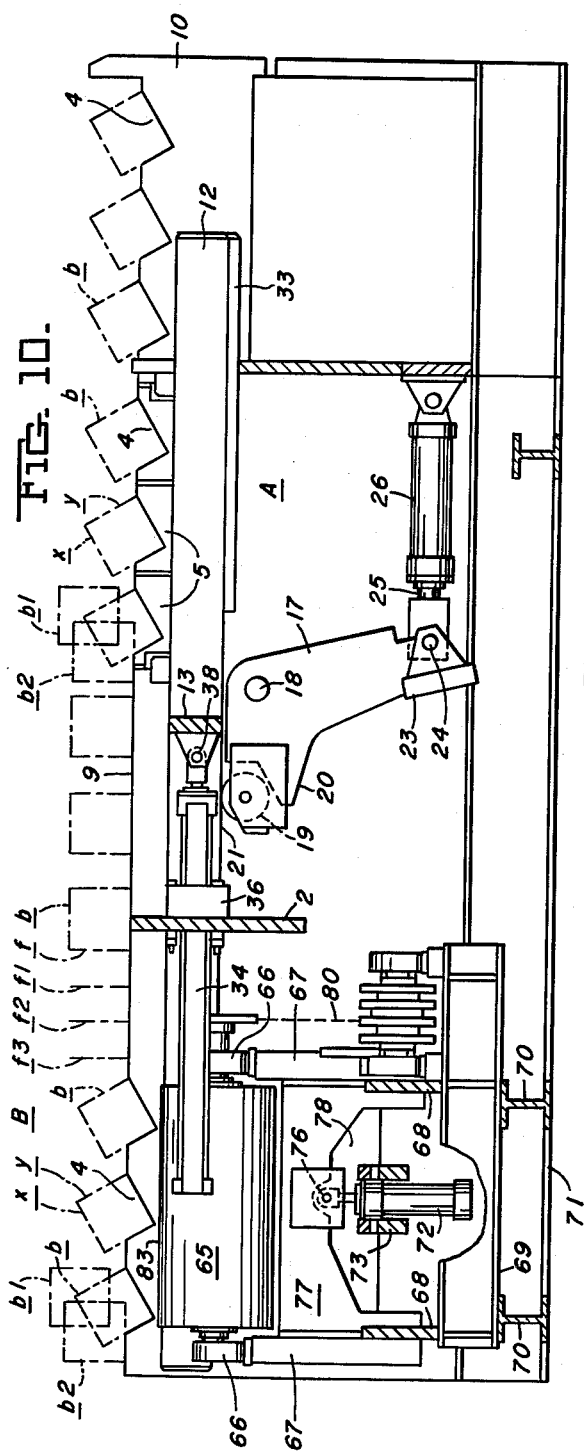
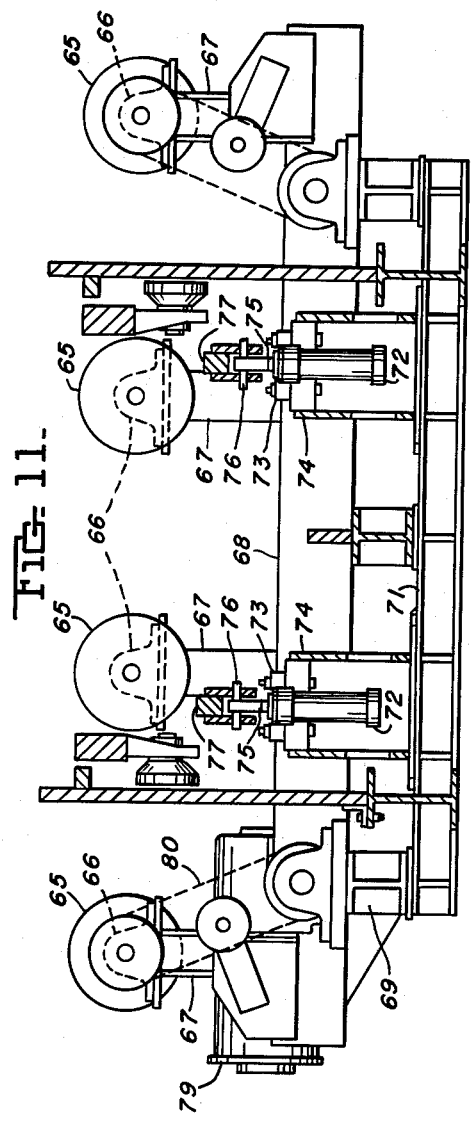
INVENTOR.
JOSEPH ILLO
By Donald G. Dalton
Attorney April 5, 1966  J. ILLO  3,243,875
BILLET INSPECTION APPARATUS AND METHOD
Filed April 1, 1964

INVENTOR.
JOSEPH ILLO
By Donald G. Dalton
Attorney

United States Patent Office 3,243,875
Patented Apr. 5, 1966

3,243,875
BILLET INSPECTION APPARATUS AND METHOD
Joseph Illo, 17020 Lorenze Ave., Lansing, Ill.
Filed Apr. 1, 1964, Ser. No. 356,539
17 Claims. (Cl. 29—407)

This invention relates to a method of and apparatus for locating surface defects in steel billets for removal prior to delivery to a rolling mill.

Unless removed prior to final rolling, cracks, seams, slag and scale inclusions, scabs, folds, and like defects on the surfaces of billets will appear on the surface of the finished product and thus result in an inferior product or a product of such poor quality that scrapping may be required. To avoid losses of this character, surface defects on billets are commonly removed before rolling by scarfing, chipping or grinding. In the case of defects such as open seams that are easily located by visual inspection, selective scarfing of only those areas containing the defects can be made to effect their removal. However, selective removal in this manner cannot be used for many defects, slag and scale inclusions in particular, which may not be visible to the naked eye. In such case it is common practice to remove the entire surface area of the billet, as by skin scrafing, when the presence of such defects is suspected, but this practice is wasteful since it involves the removal of large quantities of metal from areas that do not contain any surface defects.

Different processes for locating invisible cracks and other surface defects in metal articles have been developed and their use in locating surface defects on steel billets for removal by selective scarfing has been proposed. Such processes usually involve the application of a material which is concentrated at the location of the defect and which will become fluorescent and visible under ray energy such as ultraviolet light. The material for this purpose may be a powder applied by dusting, a liquid or penetrating oil applied by immersing, spraying or painting the article, or a liquid suspension of the material in particle form which may also be applied by spraying or drenching. However, such proposals have not proved practical for steel billets due to cost resulting from the excessive time and manual labor required for handling the billets, and the practice of skin scarfing the entire surface of the billets as mentioned above has continued.

One object of this invention accordingly is to provide an apparatus that will reduce the cost of inspecting billets for surface defects according to known processes as mentioned above. A further and related object is to provide an apparatus which will enable inspection of a large number of billets by a few operators in a short period of time.

Although the apparatus of this invention may be used for any detecting process such as those mentioned above, the preferred embodiment shown in the drawings is particularly designed for the process in which a liquid suspension of magnetizable particles which will fluoresce under ultraviolet light is applied to all surfaces of a billet to be inspected after which a low voltage high amperage current is passed through the billet so that the fluorescent particles on the surface of the billet will be magnetized and concentrated in the surface areas containing the defects to be removed where they will be rendered visible when the billet is inspected under ultraviolet light. An example of this process is the "Magnaglo" process of the Magnaflux Corporation. Modification of the preferred embodiment may be made of course to adapt it for use with other known detecting processes as mentioned above.

Other objects of the invention will become apparent from the following description and the accompanying drawings in which:

FIGURE 2 is a somewhat diagrammatic and partial side elevational view taken in a direction looking from the bottom of FIGURE 1 and showing the general arrangement of the billet handling apparatus with respect to the other parts of the apparatus;

FIGURE 3 is a fragmentary end view of the billet handling mechanism to the left of its longitudinal center line as viewed in the direction of the line III—III in FIGURE 1 and which illustrates the mounting of the magnetizing electrodes thereon;

FIGURE 4 is a fragmentary elevational view of the magnetizing electrodes looking in the direction of the line IV—IV of FIGURE 1;

Figure 1:
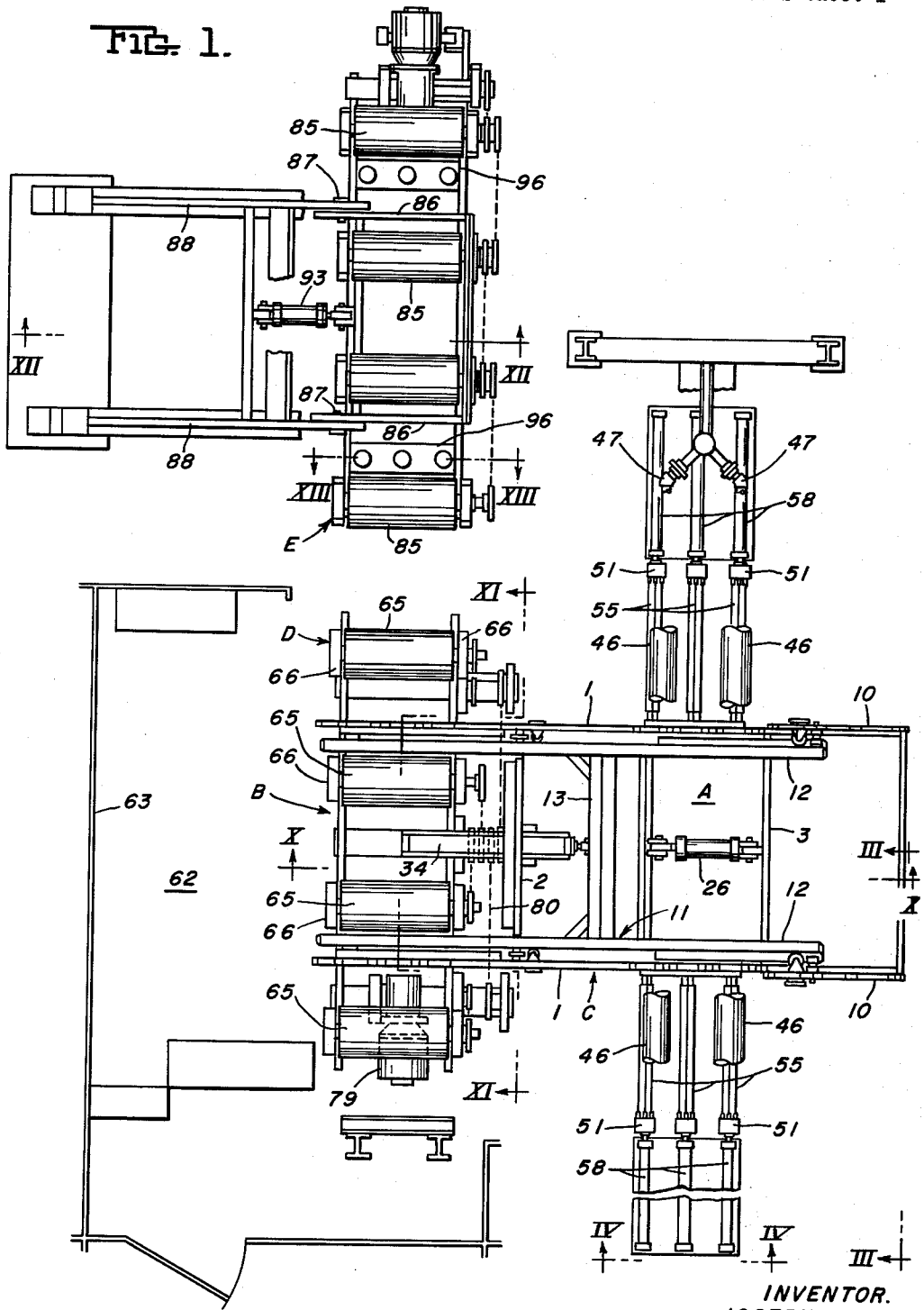
FIGURE 1 is a plan view of a billet inspection apparatus constructed in accordance with the principles of this invention with parts thereof broken away and shown fragmentarily and in which other parts such as the visible light excluding shed at the inspection station are shown diagrammatically.
Figure 12:
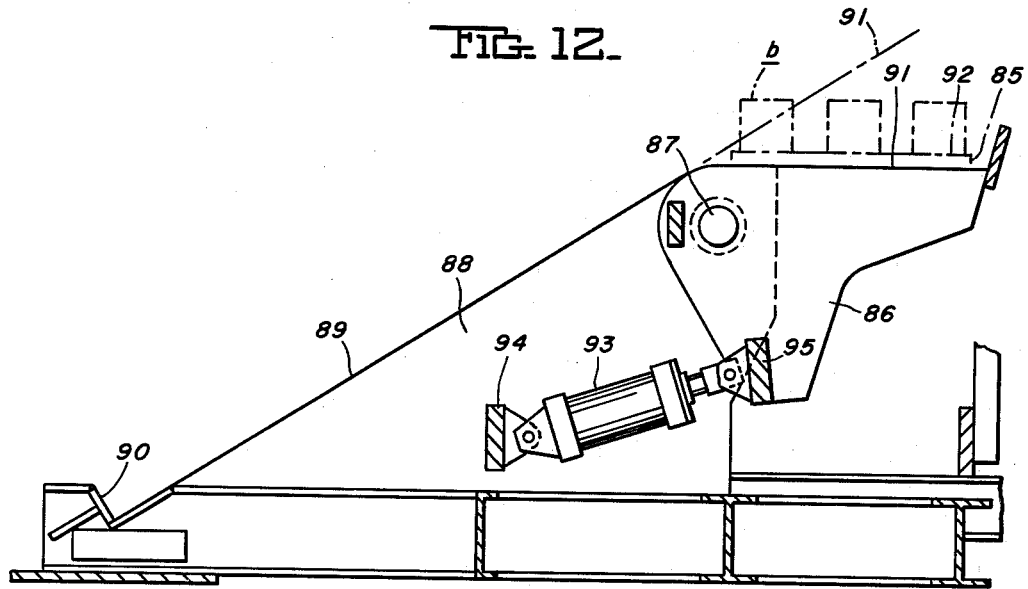
Figure 13:
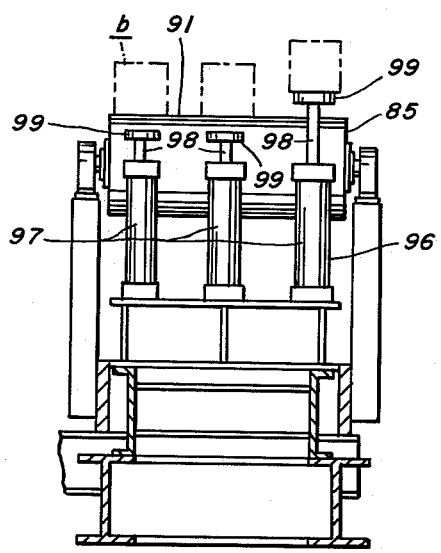
Figure 14:
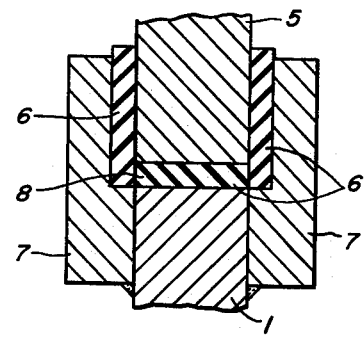

FIGURES 5 and 6 respectively are plan and side elevational views of the billet handling mechanism which forms a part of the apparatus shown in FIGURE 1;

FIGURES 7, 8 and 9 respectively are sectional views taken respectively along the lines VII—VII, VIII—VIII and IX—IX of FIGURE 5;

FIGURE 10 is a sectional and elevational view looking in the direction of line X—X of FIGURE 1;

FIGURE 11 is a sectional view taken substantially along the line XI—XI of FIGURE 1 and in which parts thereof have been omitted and broken away and other parts are shown in elevation to illustrate the relative arrangement and location of such parts on the billet discharge conveyor at the inspection station;

FIGURE 12 is a view taken substantially along the line XII—XII of FIGURE 1 which shows the general construction of the kick-off skids for the run-out table which receives inspected billets from the billet inspection station;

FIGURE 13 is a view taken along the line XIII—XIII of FIGURE 1 which shows the arrangement of the hydraulic cylinders for maintaining inspected billets on the run-out table for subsequent removal by the kick-off skids at the run-out table; and FIGURE 14 is a sectional view taken along the line XIV—XIV of FIGURE 6.

The apparatus of this invention, generally stated, and with reference to FIGURE 1, comprises a pair of laterally spaced work stations A and B which are located at opposite ends of a billet handling machine C and are respectively adapted to support a plurality of billets in parallel and angularly inclined positions. At the station A the billets are treated to render surface defects detectable and at the station B the billets are visually inspected for surface defects which are marked for subsequent removal by scarfing. In a manner to be described, the machine C is operated to rotate the billets through successive angles of 90° at each of the stations A and B to present all sides thereof for treatment at the station A and for inspection at the station B, and to transfer the billets from the station A to the station B. After inspection at the station B, the billets are removed from the handling machine C by a roller conveyor D and delivered in an endwise direction to a run-out table E where they are collected on skids for delivery by a fork-lift truck to a scarfing unit for removal of surface defects, or to a rolling mill if there are no defects that need removal by scarfing.

As best shown in FIGURES 5 through 9, the billet handling machine C comprises parallel side plates 1 which are held in spaced relation by cross plates 2 and 3. The side plates have notches 4 along their upper edges in which the billets are supported. At the station B, the notches 4 are formed in the upper edges of the side plates 1 and at the station A they are formed in individual plates 5 which have an insulated support on the side plates 1 for a purpose to be described. The plates 5 are electrically insulated from each other and the side plates 1 by strips 6 of electrical insulating material and are held in position along the upper edge of the side plate 1 by plates 7 that are welded to the side plates 1. The upper edges of the side plates 1 are recessed at 8 for the reception of the insulated plates 5 so that the notches 4 in the plates 5 at the station A will be at the same vertical level as the notches 4 at the station B. The notches 4 are arranged in laterally aligned pairs, preferably three in number, to provide for the support of three billets at each of the stations A and B. Between the stations A and B, the upper edges 9 of the side plates provide a support for another group of three billets and thus an intermediate station where each group is temporarily supported in being transferred from the station A to the station B. A billet receiving station is formed by arms or extensions in the form of plates 10 projecting to the right as viewed in the drawings from the ends of the side plates 1. The extensions 10 have three aligned pairs of notches 4 in which three billets are received from the arms of a fork-lift truck. The spacing of the notches 4 in a longitudinal direction along the side plates 1 at the stations A and B and along the extensions 10 is the same to facilitate the transfer of billets in groups of three from the extensions 10 to the station A and thereafter to the station B.

A frame or carriage 11 is mounted for vertical and horizontal movement between the side plates 1 for effecting turning movement of the billets in the notches 4 and for their transfer in a lateral or sidewise direction from right to left along the upper edges of the side plates 1. The frame 11 comprises laterally spaced and parallel side bars 12 which are respectively arranged along the inner sides of the side plates 1 and are secured in laterally spaced relation by a cross bar 13. The frame 11 normally occupies the retracted or lowered position shown in FIGURES 5 and 6 in which it has supporting engagement on the cross plate 2 at the bottom of notches 14 therein and on the upper edge 15 of the cross plate 3. In this position, the upper surface 16 of each side bar 12 is positioned below the notches 4 and the billets supported therein as best shown in FIGURE 6.

Vertical movement of the side bars 12 to lift the billets out of positions supported in the notches 4 and on the side plate edges 9 is effected by a pair of levers 17 in the form of bellcranks that are pivotally supported by stud shafts 18 on the side plates 1. Lifting rollers 19 on the outer ends of the upper arms 20 of the levers 17 have rolling engagement with the under surfaces 21 of the frame side bars 12. At the lower ends of their other arms 22 the bell-crank levers 17 are connected by a transversely extending bar 23 which has a pivotal connection 24 at its center with the piston rod 25 of a fluid pressure motor 26 that has a pivotal connection 27 at its other end with the stationary cross plate 3. Upon operation of the motor 26 to move its piston rod 25 outwardly to an extended position, the levers 17 pivot in a clockwise direction as viewed in FIGURE 6 so that the engagement of the lifting rollers 19 with the under surfaces 21 of the side bars 12 operates to elevate the side bars 12 to a position in which their upper surfaces 16 are arranged vertically above the upper edges of the side plates 1. Upward movement of the side bars 12 in this manner raises the billets out of the notches 4 and out of supporting engagement with the upper side plate edges 9.

Tilting movement of the frame 11 about the lifting rollers 19 is limited by pairs of rollers 28 and 29 at opposite ends of the frame 11. The rollers 28 are rotatably supported by brackets 30 secured to and extending downwardly from the side bars 12 and are adapted to have rolling engagement with guide bars 31 that are welded to the side plates 1 along the inner surfaces thereof. The rollers 29 are rotatable on pins 32 mounted on and projecting inwardly from the side extension plates 10 and are adapted to have rolling engagement with guide bars 33 welded to the side bars 12. If the load on the frame 11 is unbalanced during upward movement thereof, the frame 11 will tilt in the direction of the unbalance about the lifting rollers 19 to positions limited either by engagement of the rollers 28 with the guide bars 31 or by engagement of the rollers 29 with the guide bars 33. In normal operation, this tilting movement of the frame 11 will take place in a clockwise direction as viewed in FIGURE 6 after removal of billets from the notches 4 at the station B in a manner to be described. In such case, initial upward movement of the lifting rollers 19 will move the frame 1 with a tilting motion to a position in which the rollers 28 engage the bars 31. Thereafter, continued upward movement of the lifting rollers 19 will move the frame 11 with a tilting action about the rollers 28 as a fulcrum to its fully elevated position in which the bars 33 engage with the guide rollers 29.

In the fully elevated position of the frame 11, engagement of the lifting rollers 19 with the bar surfaces 21 and of the rollers 28 and 29 with the guide bars 21 and 33 operates to hold the frame 11 in a horizontal position and to guide its movement horizontally with respect to the side plates. Such horizontal movement is imparted to the frame 11 by a double-acting fluid pressure motor 34 which extends through an opening in the cross plate 2 and has a pivotal support thereon that is provided by trunnion connections 36. A piston rod 37 projecting from the motor 34 has a pivotal connection 38 to the frame cross bar 13. The drawings show the motor 34 with its piston rod 37 in retracted position and the frame 11 at one extreme position in which its side bars 12 are positioned under all of the notches 4 at the station B. Upon operation of the motor 34 to extend its piston rod 37, the frame 11 is moved to the right from this position to render it effective for turning billets in the notches 4 or to pick up a group of billets from the notches 4 in the extensions 10 in a manner to be described. Bracket-supported guide rollers 39 on the side plates 1 and similar rollers 40 on the side plate extensions 10 have rolling engagement with the sides of the bars 12 during horizontal movement thereof and thus cooperate in guiding such movement.

The specific shape of the notches 4 and the manner in which the side bars 12 are manipulated to effect turning movement of billets positioned therein are disclosed in Patent No. 3,042,226, issued July 3, 1962, to Robert B. Maciejczak. For the purpose of this description it will be sufficient to indicate that, with reference to FIGURE 10 wherein the billets are designated by the letter $b$ and are shown schematically in broken lines, each laterally aligned pair of notches 4 operates to support a billet $b$ in an angularly inclined position relative to a vertical plane passing through the billet and, more specifically, with diagonal corners of the billets supported in such notches arranged in a substantially vertical plane. In this manner, each billet supported in a pair of notches 4 has two upwardly facing surfaces $x$ and $y$ accessible for treatment at the station A and for observation of the surface $x$ at the station B. As further explained in the above mentioned patent, one side 41 of each notch 4 has a slope that is greater than an angle of 45° by an amount that the slope of its other side 42 is less than 45°, this arrangement rendering the top edge of the side plates 1 adjacent the upper ends of the notch sides 41 effective as turning lands 43 for turning the billets in a clockwise direction as viewed in FIGURE 6. Such turning movement is effected by first operating the motor 34 to move the frame side bars 12 to the right, as viewed in the drawings, a distance sufficient to enable its return movement effective to position one corner of each billet over a turning land 43 and, for this purpose, the motor 34 has an indexing control (not shown) for billet turning that stops the frame 11 after it has been moved the required distance. Next, the motor 26 is operated to pivot the bell-crank lever 17 and elevate the side bars 12 to their uppermost positions in which their top surfaces 16 are arranged above the upper edges 9 of the side plates 1 and to thereby move the billets upwardly out of the notches 4. This results in turning movement of the billets in a clockwise direction through an angle corresponding to the slope of the notch sides 42 and to positions, designated b1 in FIGURE 10, in which the billet surfaces x are in a horizontal plane. Thereafter, the motor 34 is operated in a reverse direction to return the frame 11 to the position shown in FIGURES 5 and 6 and this moves the billets to positions, designated b2 in FIGURE 10, in which one corner of each thereof is arranged over a turning land 43. Subsequent operation of the motor 26 to lower the frame 11 returns the billets to their positions supported in the notches 4 and, as this lowering movement takes place, the billets engage the turning lands 43 and are turned in a clockwise direction through an angle corresponding to the slope of the notch sides 41 and thus completes the turning movement of the billets through an angle of 90°. The frame 11 must be operated three times in this manner to place all four surfaces of each billet at the station B in the position designated by the letter x for inspection by the operators. These operations it will be noted with reference to FIGURE 10 cause rotation of two of the billets supported in notches 4 on the extensions 10 at the billet receiving station, although such rotation is not required for subsequent treatment and inspection of such billets.

As indicated, the notches 4 have the same spacing on the extensions 10 at the billet receiving station and at the stations A and B to facilitate their transfer to such stations by horizontal movement of the frame 11. Such transfer is effected, with further reference to FIGURE 10, by operating the motor 34 to move the frame 11 to the right a distance corresponding to the distance the billets on the extensions 10 must travel in being transferred to the station A, this being effected by suitable indexing controls (not shown) for the motor 34. After the frame 11 has been moved to the right in this manner, the motor 26 is actuated to elevate the frame 11 to a position in which all billets are supported on its side bars 12 as described above, and the motor 34 is then actuated to retract its piston rod and the frame 11 to the position shown in the drawings in which the group of three billets b picked up from the extension plates 10 at the billet receiving station will be arranged directly above the notches 4 at the station A. The motor 26 is then actuated to lower the frame 11 and thus the billets carried thereby to positions supported in the notches 4 at the stations A. These operations of the frame 11 also operate to pick up a group of three billets b at the station A and transfer such billets to the intermediate position supported on the edges 9 as shown in FIGURE 10. During subsequent operation of the frame 11 to turn the billets in the notches 4 as described above, each billet in the group of three on the edges 9 at the intermediate station is moved to the left by an amount corresponding to the horizontal indexing movement of the frame 11 that is required for each quarter-turn of the billets as described above. For example, the billet face f of the end billet b supported on the edge 9 will move to the position designated by the line f1 at the first turning operation of the billets, to the position designated by the line f2 at the second turning operation, and to the final position designated by the line f3 at the last billet turning operation. In this final position, the group of billets on the edges 9 are spaced with respect to the notches 4 at the station B the same distance as that between the notches 4 on the extension 10 and the notches 4 at the station A, so that subsequent transfer operation of the frame 11 to drop a group of three billets in the notches at the station A will also operate to drop the group of three previously supported on the edges 9 in the notches at the station B.

As indicated above, surface defects are detected by saturating the billet surfaces with a liquid suspension of magnetizable particles that become fluorescent under ultraviolet light. While such fluid may be applied to the billet surfaces in any convenient manner, for example, by spraying, this is accomplished at the station A by an apparatus 45 that applies such fluid to the billets with a drenching action. The apparatus 45 comprises a pair of horizontal tanks 46 that are arranged in positions above and parallel to the billets and are supported for rotation about a horizontal axis. A suspension of the magnetic particles is delivered continuously through supply lines 47 to the tanks 46 to maintain such tanks filled with fluid. Discharge of the fluid contents of the tanks 46 onto billets supported at the station A is effected by a motor 49 that operates through a belt drive 50 to rotate the tanks 46 and cause them to dump at least a portion of their fluid contents downwardly onto the billets lying underneath. This fluid dumping action takes place with a cascading operation along the length of the tanks such that the liquid drenches the underlying billets. Since the billets supported in the notches 4 occupy an angularly inclined position as described above, the two upper surfaces x and y thereof will be drenched with fluid upon rotation of the tanks 46 in this manner. After drenching the upper surfaces, the billet handling mechanism C is actuated to rotate the billets through two quarter-turns to positions in which the bottom two surfaces thereof are facing upwardly so that they may be drenched in like manner. Since the fluid for rendering the defects in the surfaces of the billets detectable may be applied as indicated in any convenient manner, it will be understood that this invention is not concerned with the specific construction of the drenching apparatus 45 and a detailed showing thereof accordingly has not been made in the drawings. The specific construction of the apparatus 45, however, is disclosed in the copending application of Arthur W. Tuemler, Serial No. 358,517, filed April 9, 1964, to which reference may be made for a more detailed disclosure.

After all sides of the billets have been drenched as described above, electric current is passed through each billet to concentrate the magnetic particles contained in the fluid at defects in the surfaces of the billets. The current for this purpose is applied to each billet by a pair of electrodes 51, there being a pair of such electrodes or six in all for the three billets supported at the station A. The insulation 6 for the plates 5 in which the notches 4 at the station A are formed as described above prevents the transmisson of this current to other metal parts of the handling mechanism C. The electrodes 51 are supported for movement into and out of engagement with the ends of the billets by supporting members 52 (FIGURES 3 and 4) that have V-shaped notches 53 at their lower ends for guided sliding engagement over angles 54 that extend in a direction axially outwardly from the billet supporting notches 4. The guide angles 54 are mounted on box-shaped supporting members 55 carried by brackets 56 supported on the side plates 1 of the billet handling mechanism. The electrodes 51 are secured to the outer ends of piston rods 57 of double-acting fluid pressure motors 58 which are mounted by brackets 59 on the angles 54 and are operated to move the electrodes 51 into and out of engagement with the ends of the billets. The electrical controls and connections that render the electrodes 51 effective to apply a magnetizing current to the billets are conventional and therefore have not been shown in the drawings.

At the station B, ultraviolet lamps including reflector units 61 of any convenient and conventional construction are provided in positions above the notches 4 for applying ultraviolet light to the underlying billets supported in such notches. In a known manner, the ultraviolet light causes the magnetizable particles that upon magnetization are concentrated on the surface of the billets at the location of defects therein to become fluorescent and visible to operators standing on a platform 62 which is located adjacent the station B at one end of the billet handling apparatus C. An enclosure in the form of a shed 63 is built over the platform 62 and the station B to exclude visible light and render the defects more easily seen by the operators. Defects noted by the operators in this manner are marked with chalk for subsequent removal by scarfing. As indicated above, the billet handling mechanism C must be operated to rotate the billets three quarter-turns in the notches 4 at the station B to present all sides thereof for inspection by operators standing on the platform 62.

The conveyor D operates to remove billets from the inspection station B in an endwise direction with respect to the positions in which they are supported on the side plates 1. It comprises four parallel conveyor rolls 65 (FIGURES 10 and 11) that are rotatable in bearings 66 on the upper end of pedestals 67 which are supported at their lower ends by stringers 68. The stringers 68 in turn are carried by cross-beams 69 which with the stringers 68 form a vertically movable frame for the conveyor D that normally occupies a retracted or lowered position supported on the cross-beams 70 of the foundation frame 71. Vertical movement is imparted to the conveyor D by a pair of hydraulic motors 72 that have trunnion supports 73 on pedestals 74 carried by the foundation frame 71. Piston rods 75 projecting upwardly from the motors 72 have pivotal connections 76 at their upper ends with motion transmitting members 77 that extend transversely with respect to the stringers 68 and form part of the structural frame work of the conveyor D. The motion transmitting members 77 are fabricated from steel slabs and are welded along their vertical edges with the roller bearing pedestals 67 and the frame stringers 68. As shown in FIGURE 10, the members 77 have a U-shape and each thus provides a central space 78 for its motor connection 76. Each of the conveyor rolls 65 is driven by an electric motor 79 through a chain and sprocket drive 80. As shown in FIGURE 6, one of the side plates 1 of the billet handling mechanism C has an opening 81 cut therein to provide for vertical movement of the chain and sprocket drive 80 and a vertical slot 82 that provides for vertical movement of one of the conveyor stringer plates 68. The axial length of the rollers 65 is such that each straddles the group of three billets $b$ supported in the notches 4 at the station B so that the conveyor D will lift all such billets when it is elevated by the motors 72. In addition, the two center rolls 65 are positioned between the side plates 1 of the handling mechanism C and the rolls 65 at the ends of the conveyor are arranged on opposite sides of such side plates so that the conveyor D has a length somewhat longer than the longest billet to be handled by the apparatus.

In the retracted or lowered position of the conveyor D, the upper edges 83 of the conveyor rolls 65 are positioned below the bottom corners of the billets $b$ supported in the notches 4 and, in this position, the conveyor D does not interfere with turning movement of the billets $b$. After inspection of the billets $b$ at the station B, the hydraulic motors 72 are operated to elevate the conveyor D and move the upper edges 83 of the rolls 65 into engagement with the billets $b$. As this upward movement continues, the billets $b$ are lifted out of the notches 4 and out of supporting engagement on the side plates 1. When the billets $b$ have been raised to positions in which they are supported on the conveyor rolls 65, the motor 79 and sprocket drive 80 are operated to deliver the billets $b$ in an endwise direction to the run-out table E. The hydraulic motors 72 are then operated to lower the conveyor rolls 65 to their retracted position so that another group of three billets may be delivered by the handling mechanism C to the inspection station B.

The run-out table E comprises an assembly of four power driven conveyor rolls 85 that is similar to the arrangement of the rolls 65 in the conveyor D. The table E is aligned with the conveyor D so that the rolls 85 receive the billets from the rolls 65. The billets are removed laterally from the run-out table E by a kick-off unit that comprises a pair of side rolls 86 that are arranged inwardly of the conveyor rolls 85 at the ends of the run-out table E and are pivotally mounted by stud shafts 87 on skid plates 88 which extend laterally outwardly from the run-out table E. The skid plates 88 have downwardly inclined skid surfaces 89 over which the billets slide to the lower end thereof to a position in which they engage with a stop 90 and from which they can be picked up and removed by the arms of a fork-lift truck to a scarfing unit. The pivotal support for the kick-off plates 86 provides for their movement from a retracted position in which their upper edges 91 are arranged below the upper edges 92 of the conveyor rolls 85 to a kick-off position in which the edges 91 are arranged as shown in dotted lines in FIGURE 12 and form a continuation of the skid surfaces 89 so that billets picked up by the plates 86 will slide downwardly over the skid surfaces 89. A double-acting fluid pressure motor 93, which has one end pivotally connected with a cross bar 94 extending between the skid plates 88 and its other end pivotally connected to a cross bar 95 extending between the kick-off plates 86, is provided for moving the kick-off plates 86 to deliver billets $b$ from the conveyor D to the skids 88.

In order to separate billets that are free of surface defects from those that need scarfing, a pair of selector units 96 (FIGURE 1) are provided on the run-out table E for retaining billets having surface defects at the table E while its rolls 85 are operated to remove those billets which do not have any surface defects for delivery directly to a rolling mill. Billets removed by the rolls 85 from the table E in this manner are delivered to a second run-out table (not shown) which is preferably constructed like the table E and is equipped with kick-off plates and skids on which the billets are collected for delivery by a fork-lift truck to a rolling mill. The selector units 96 for the purpose indicated are located at opposite ends of the run-out table E between the end rolls 85 and the kick-off plates 86. Each of the units 96 comprises three vertical hydraulic motors 97 that are arranged at spaced intervals relative to the conveyor rolls 85 and in positions corresponding to the positions of the billets $b$ supported thereon. Each of the motors 97 has an upwardly projecting piston rod 98 with a lift plate 99 mounted on its upper end. The motors 97 are arranged in pairs longitudinally of the conveyor D so that operation of each pair will move their lift plates 99 upwardly to lift a billet $b$ out of engagement with the conveyor rolls 85. In operation, the pairs of motors 97 under billets that have defects to be removed by scarfing are operated to retain such billets at the table E so that the remainder of the billets $b$ which do not need scarfing may be removed from the run-out table E by the rolls 85.

From the foregoing, it will be apparent that the apparatus of this invention facilitates the inspection of billets for surface defects and that it further enables the inspection of a large number of such billets in a minimum period of time. In this respect, it will be noted that the end plates 10 provide a billet receiving station on which a group of a plurality of billets is placed by the arms of a fork-lift truck and that the conveyor D and run-out table E provide for the removal of such billets after inspection for delivery by a fork-lift truck to scarfing apparatus. Attention is also directed to the fact that the billet handling apparatus C provides for the transfer of the billets in groups of a plurality of billets in a lateral direction from the positions in which they are received on the plates 10 at the billet receiving station through the processing station A and intermediate station on the side plate edges 9 to the inspection station B, where surface defects are noted by the operators and marked for removal by scarfing. In addition, the specific arrangement of the billet supporting notches 4 at the stations A and B and the manner in which the frame 11 is operated to rotate the billets in such notches enables treatment of the billets at the station A and inspection at the station B. This arrangement, more particularly, enables the use of a drenching apparatus 45 for applying defect detecting fluid to the surfaces of the billets and the use of electrodes 51 in multiple pairs for applying a magnetizing current thereto at the station A to render surface defects visible under the ultraviolet lamps 61 at the station B. By reason of these features, the production capacity of a single apparatus constructed as shown in the drawings is such that it can be used to inspect all of the billets that must be processed in the scarfing area of a rolling mill.

While one embodiment of my invention has been shown and described it will be apparent that other adaptations and modifications may be made without departing from the scope of the following claims.

I claim:

1. A method of inspecting and determining flaws in billets comprising supporting a plurality of billets in parallel and angularly inclined positions, drenching said billets with a liquid having magnetizable particles therein, rotating the billets through two quarter-turns, then repeating said drenching, passing electric current through each billet to magnetize the said particles deposited thereon by drenching, conveying simultaneously the coated billets to an inspection station, and inspection with ultraviolet light to determine the location of flaws in said billets.

2. A method of inspecting and determining flaws in billets which comprises arranging said billets in groups of a plurality of billets at spaced treating and inspection stations, supporting said billets at each of said stations on a pair of members having upwardly open notches arranged in aligned pairs in which said billets are received in parallel and angularly inclined positions with diagonal corners of each billet in a substantially vertical plane, drenching the group of billets at said treating station with a medium for rendering surface defects detectable, then transferring said last-named group of billets laterally to positions supported in said notches at said inspection station, and rotating said billets through successive angles of 90° in the said notches at said inspection station for inspection of the side surfaces of each of said billets to determine the location of surface flaws.

3. A method of inspecting billets which comprises providing a pair of supporting members having upwardly open notches arranged along the upper edges thereof in groups of aligned pairs at spaced treating and inspection stations, each of said groups of notches being adapted to support a plurality of billets in parallel and angularly inclined positions with diagonal corners of each billet in a substantially vertical plane, charging a plurality of billets in supported positions in the groups of said notches at said treating station, drenching the billets supported at said treating station with a medium for rendering surface defects detectable, transferring said billets laterally from said treating station to positions supported in the group of said notches at said inspection station, and rotating the said billets through successive angles of 90° in the said notches at said inspection station for inspection of the side surfaces thereof to determine the location of surface flaws, and then removing the inspected billets from said inspection station.

4. The method defined in claim 3 characterized by a successive step which is performed after the said removal of said inspected billets from said inspection station and comprises simultaneously charging a plurality of untreated billets in the said group of notches at said treating station and transferring a plurality of treated billets to supported positions in the said group of notches at said inspection station.

5. A billet handling apparatus comprising a pair of laterally spaced work stations respectively including means for supporting a plurality of bills in parallel and angularly inclined positions, one of said stations being a billet treating station and the other of said stations being a billet inspection station, means at each of said stations cooperating with said supporting means for rotating said billets through successive angles of 90° and including means for transferring the billets in a lateral direction from the said supporting means at said treating station to the said supporting means at said inspection station, and means at said inspection station for disengaging billets from said supporting means and for removing said billets in an endwise direction from said apparatus.

6. An apparatus as defined in claim 5 characterized by means arranged over the said supporting means at said billet treating station for coating the billets supported at such station with a medium for rendering surface defects detectable.

7. An apparatus as defined in claim 6 characterized by means at said billet inspection station for applying light to the surfaces of the billets supported at such station for rendering surface defects therein visible.

8. A billet inspection apparatus comprising a first support for receiving a group of a plurality of billets to be inspected and a second support to which said group is transferred from said first support, said supports being spaced laterally relative to each other and respectively including means for supporting said billets in parallel inclined positions with the side surfaces of each billet angularly inclined relative to a vertical plane passing through each billet, billet handling means for turning the billets at each of said supports through successive angles of 90°, said handling means including means for transferring a group of said billets from said first support to said second support, and means at said second support for relevating said billets from their said supported positions thereon and removing them in an endwise direction from said apparatus.

9. An apparatus as defined in claim 8 characterized by said elevating means comprising a roller conveyor including a plurality of parallel conveyor rolls arranged with their axes extending transversely relative to the billets supported on said second support, and means for elevating said roller conveyor from a retracted position in which said rolls are below and out of engagement with said last-named billets to an operating position in which said rolls are effective to remove said billets from said apparatus, movement of said conveyor to its said operating position being effective to engage said rolls with said billets and lift them out of engagement with the said supporting means at said first support.

10. An apparatus as defined in claim 9 characterized by the provision of a run-out table comprising a plurality of conveyor rolls parallel to the said conveyor rolls of said roller conveyor and on which the billets are received from said roller conveyor rolls, and means including kick-off bars supported for pivotal movement about an axis at one side of said run-out table for removing billets in a lateral direction from said run-out table.

11. An apparatus as defined in claim 10 characterized by means for retaining selected ones of said billets on said run-out table while the remaining billets are removed in an endwise direction over its said conveyor rolls, said selective retaining means comprising fluid pressure motors arranged in pairs under opposite ends of each billet supported on said run-out table rolls, each of said pairs being effective upon operation to lift an overlying billet out of supporting engagement with said run-out table rolls.

12. Billet inspection apparatus comprising a billet handling machine having separate means at opposite ends thereof for supporting a group of a plurality of billets in parallel inclined positions with diagonal corners thereof arranged in a substantially vertical plane, a billet handling means including means for rotating the billets on each of said supporting means through successive angles of 90°, and for transferring a group of said billets from the supporting means at one end of said machine to the supporting means at the other end of said machine, and a conveyor means for removing the billets in an endwise direction from said last-named supporting means.

13. A billet handling apparatus comprising a pair of spaced parallel side members respectively having a plurality of billet supporting notches at opposite ends thereof, said notches being arranged in laterally aligned pairs for supporting a group of a plurality of billets on said side members in parallel positions extending transversely thereof at each of said opposite ends, means for rotating said billets in said notches through successive angles of 90° and for transferring a group of said billets in a lateral direction from the notches at one end of said members to the notches at the other end thereof, and means comprising a vertically movable roller conveyor arranged transversely of said side members at the said other end thereof for lifting billets out of supporting engagement in the said notches thereon and removing them in an endwise direction from said apparatus.

14. Apparatus as defined in claim 13 characterized by said roller conveyor comprising parallel rolls arranged between and on opposite sides of said side members, a framework on which said rolls are rotatably supported, and means mounting said framework for vertical movement relative to said side members.

15. Apparatus as defined in claim 13 characterized by said side members having horizontal upper edges between the said notches at opposite ends thereof, said horizontal upper edges providing an intermediate support to which a group of billets is transferred from the notches at said one end before its transfer to said group of notches at said other end, the said notches in said groups being spaced equal distances relative to each other and thereby determining the spacing between said billets.

16. Apparatus as defined in claim 15 characterized by said side members having extensions at said one end with notches therein arranged in pairs for the reception of a group of a plurality of billets from the arms of a fork-lift truck, and by said transfer means being operative to transfer billets in a lateral direction from the notches on said extensions to the notches on said side members at said one end.

17. A billet inspection apparatus comprising a first support for receiving a group of a plurality of billets to be inspected and a second support to which said group is transferred from said first support, each of said supports comprising a pair of spaced parallel side members respectively having a plurality of upwardly open billet supporting notches arranged at spaced intervals along the upper edges thereof, said notches being arranged in laterally aligned pairs for supporting a group of a plurality of billets on said side members in parallel inclined positions with the side surfaces of each billet angularly inclined relative to a vertical plane passing through each billet, means at said first support for coating the billets supported thereon with a medium for rending surface defects detectable, billet handling means for turning the billets at each of said supports through successive angles of 90°, said handling means including means for transferring a group of said billets laterally in a sidewise direction from said first support to positions supported in the said notches of said second support, means at said second support for rendering defects in the billets supported thereby visible, and means for removing the billets from said second support after rotation by said billet handling means through three quarter-turns and visible inspection of all sides thereof to determine the location of surface defects therein.

References Cited by the Examiner

UNITED STATES PATENTS

| | | | |
|---|---|---|---|
| 1,999,657 | 4/1935 | Heath | 29—200 |
| 2,267,999 | 12/1941 | Switzer | 324—38 |
| 2,391,510 | 12/1945 | Pioch et al. | 29—200 |
| 2,495,545 | 1/1950 | Peterson et al. | 29—407 |
| 2,500,204 | 3/1950 | Ronay | 29—200 |
| 2,837,200 | 6/1958 | Evans | 198—33.4 |
| 2,990,512 | 6/1961 | Gewartowski et al. | 324—38 |
| 3,042,226 | 7/1962 | Maciejczak | 214—1 |

WHITMORE A. WILTZ, *Primary Examiner.*

THOMAS H. EAGER, *Examiner.*